(12) United States Patent
Cassady

(10) Patent No.: US 11,489,989 B2
(45) Date of Patent: Nov. 1, 2022

(54) SYSTEM FOR ILLUMINATING AND VIEWING RECESSED ANGLED SURFACES

(71) Applicant: VIAVI Solutions Inc., San Jose, CA (US)

(72) Inventor: Kevin Cassady, Monroe, WA (US)

(73) Assignee: VIAVI Solutions Inc., San Jose, CA (US)

( * ) Notice: Subject to any disclaimer, the term of this patent is extended or adjusted under 35 U.S.C. 154(b) by 369 days.

(21) Appl. No.: 16/859,278

(22) Filed: Apr. 27, 2020

(65) Prior Publication Data

US 2021/0337091 A1 Oct. 28, 2021

(51) Int. Cl.
*G01N 21/15* (2006.01)
*H04N 5/225* (2006.01)
*G02B 6/38* (2006.01)

(52) U.S. Cl.
CPC ........... *H04N 5/2253* (2013.01); *G01N 21/15* (2013.01); *G02B 6/3898* (2013.01); *H04N 5/2254* (2013.01); *G01N 2021/157* (2013.01)

(58) Field of Classification Search
CPC .... H04N 5/2253; H04N 5/2254; G01N 21/15; G01N 2021/157; G02B 6/3898
See application file for complete search history.

(56) References Cited

U.S. PATENT DOCUMENTS

| | | | | |
|---|---|---|---|---|
| 5,554,100 A | * | 9/1996 | Leiner | A61B 1/07 600/920 |
| 6,943,943 B1 | * | 9/2005 | Furuhashi | G02B 21/084 359/387 |
| 7,486,441 B2 | * | 2/2009 | Weiss | G02B 21/16 359/368 |

FOREIGN PATENT DOCUMENTS

GB 348202 A * 5/1931

* cited by examiner

*Primary Examiner* — David P Porta
*Assistant Examiner* — Fani Polyzos Boosalis
(74) *Attorney, Agent, or Firm* — Harrity & Harrity, LLP

(57) ABSTRACT

An optical system may include an objective lens system having a primary optical axis and a relay lens system having a relay optical axis. The relay optical axis may have a first angular offset with respect to the primary optical axis. The objective lens system may be configured to provide light from a light source to the relay lens system and provide light from the relay lens system to an image sensor. The relay lens system may be configured to provide light from the objective lens system to an end face of an optical fiber, where the end face has a second angular offset with respect to a cross-sectional axis of the optical fiber. The relay lens system may provide light reflected from the end face to the objective lens system.

20 Claims, 8 Drawing Sheets

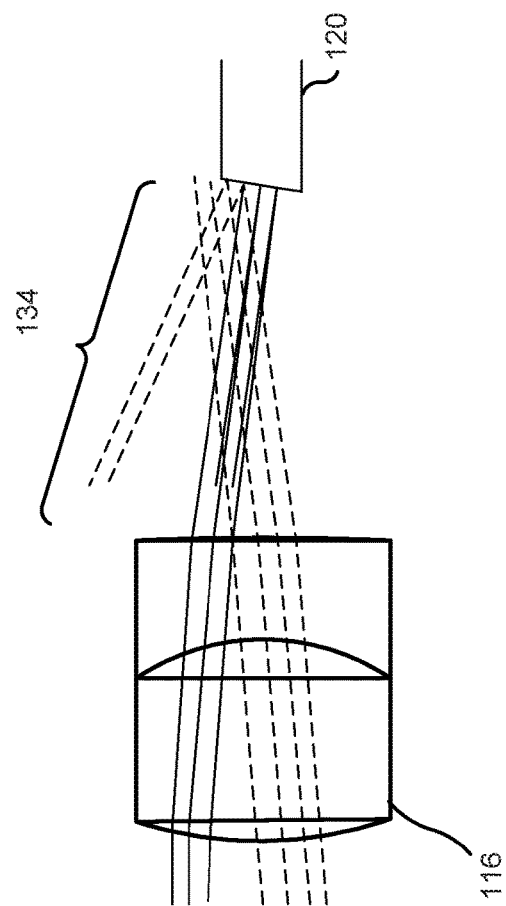

SYSTEM FOR ILLUMINATING AND VIEWING RECESSED ANGLED SURFACES

BACKGROUND

Contaminants, such as dust, dirt, oil, and/or the like, on an end face of an optical fiber connector can negatively impact network performance by increasing signal loss and damaging the optical fiber. As bandwidth demands rise and signal loss budgets become tighter, the ability to inspect end faces of optical fibers before connecting has become critical.

SUMMARY

According to some implementations, an optical system may include: an objective lens system having a primary optical axis; and a relay lens system having a relay optical axis, wherein the relay optical axis has a first angular offset with respect to the primary optical axis; wherein the objective lens system is configured to: provide light from a light source to the relay lens system, and provide light from the relay lens system to an image sensor; and wherein the relay lens system is configured to: provide light from the objective lens system to an end face of an optical fiber, wherein the end face has a second angular offset with respect to a cross-sectional axis of the optical fiber, and provide light reflected from the end face to the objective lens system.

According to some implementations, a device may include an attachment housing having a proximal end and a distal end, wherein the distal end is configured to be positioned within a bulkhead; an objective lens system having a primary optical axis; and a relay lens system positioned within the distal end of the attachment housing, wherein the relay lens system has a relay optical axis having a first angular offset with respect to the primary optical axis; wherein the objective lens system is configured to: provide light from a light source to the relay lens system, and provide light from the relay lens system to an image sensor; and wherein the relay lens system is configured to: provide light from the objective lens system to an end face of an optical fiber, wherein the end face has a second angular offset with respect to a cross-sectional axis of the optical fiber, and provide light reflected from the end face to the objective lens system.

According to some implementations, a method may include providing, by a device, light along an illumination path to an end face of an optical fiber, wherein the end face has a first angular offset with respect to a cross-sectional axis of the optical fiber, and wherein a portion of the illumination path proximate the end face has a second angular offset with respect to the mechanical axis of the bulkhead; and receiving, by the device and with an image sensor, light reflected by the end face.

BRIEF DESCRIPTION OF THE DRAWINGS

FIGS. 1A-1D are diagrams of one or more example implementations of an optical device for illuminating and viewing recessed angled surfaces described herein.

DETAILED DESCRIPTION

Figure 1A:
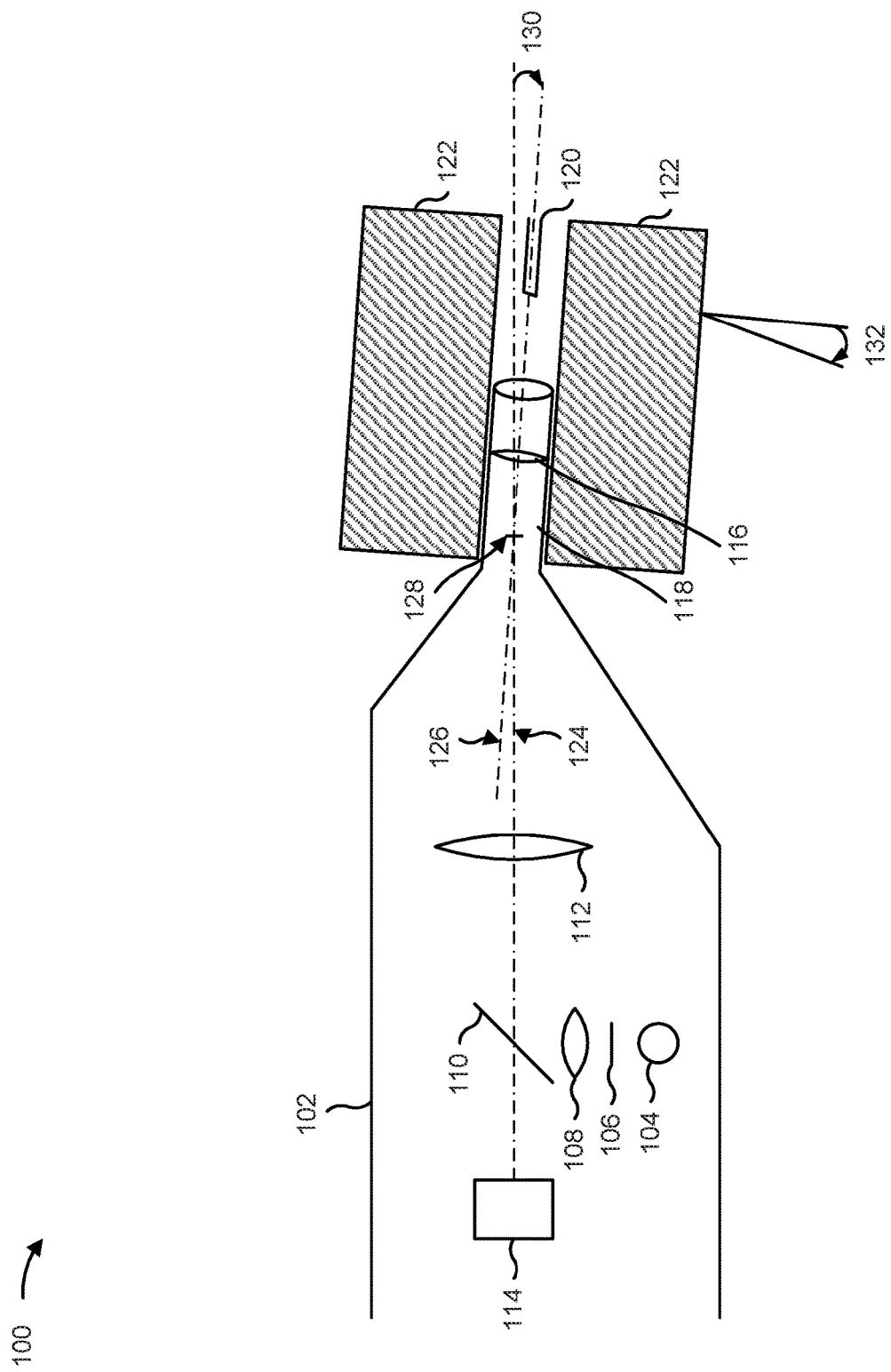

The following detailed description of example implementations refers to the accompanying drawings. The same reference numbers in different drawings may identify the same or similar elements.

Before connecting an optical fiber to a device or another optical fiber, a technician may use a fiber inspection device (e.g., a video microscope and/or the like) to inspect an end face of the optical fiber to confirm that the end face is clean and undamaged. The fiber inspection device may include a light source to illuminate the end face and an image sensor to capture images and/or video of the end face. The fiber inspection device may also include a series of lenses to provide light from the light source to the end face and to provide light reflected from the end face to the image sensor. For some optical fibers, the end face may be recessed within a connector and/or a bulkhead, and the fiber inspection device may include a tip designed to be inserted into the connector and/or the bulkhead to position lenses near the end face. However, some optical fibers have an angled end face (e.g., an angled polish fiber), and light reflects off the end face at an angle toward the connector and/or the bulkhead. Because the light does not reflect back through the lenses, the fiber inspection device cannot form an image and/or video of the recessed, angled end face. Furthermore, when optical fibers having angled end faces are deployed in a physically constrained system including high-density connectors, the technician may need to remove the optical fiber with an angled end face as well as multiple adjacent connectors to image the angled end face, which further increases risk of contamination and/or damage to the optical fibers.

Some implementations described herein provide an optical device and/or an optical system forming an illumination path from a light source to an angled end face of an optical fiber, where a portion of the illumination path proximate the angled end face has an angular offset with respect to a cross-sectional axis of the optical fiber. In some implementations, the optical device and/or the optical system may include an objective lens system having a primary optical axis and a relay lens system having a relay optical axis, where the relay optical axis has an angular offset with respect to the primary optical axis. In some implementations, the optical system may include an objective lens system having a primary optical axis and a relay lens system, where an illumination path from the objective lens system to the relay lens system has an angular offset with respect to the primary optical axis. Including one or more such angular offsets may permit light from the angled end face to reflect back into the relay lens system and through the objective lens system to an image sensor.

In this way, the image sensor may be used to provide an image of the angled end face to the technician, and the technician may determine whether the angled end face is clean and undamaged (e.g., without removing the bulkhead of the connector, which may introduce additional contaminants).

FIGS. 1A-1D are diagrams of one or more example implementations 100 of an optical device for illuminating and viewing recessed angled surfaces described herein. As shown in FIG. 1A, the optical device may include a device housing 102, a light source 104, a diffuser 106, a condensing lens system 108, a semi-reflective beam splitter 110, an objective lens system 112, an image sensor 114, a relay lens system 116, and an attachment housing 118. In some implementations, one or more elements of the optical device may form an optical system. For example, the optical system may include the diffuser 106, the condensing lens system 108, the semi-reflective beam splitter 110, the objective lens system 112, the relay lens system 116, and/or the like. As shown in FIG. 1A, the light source 104, the diffuser 106, the condensing lens system 108, the semi-reflective beam splitter 110, the objective lens system 112, and the image sensor 114 may be positioned within the device housing 102. In some implementations, the optical device may illuminate an end face of an optical fiber 120 recessed within a bulkhead 122 (e.g., of a connector, of an optical switch, and/or the like). In some implementations, the optical device may be a finite conjugate imaging microscope with coaxial illumination.

Figure 1B:
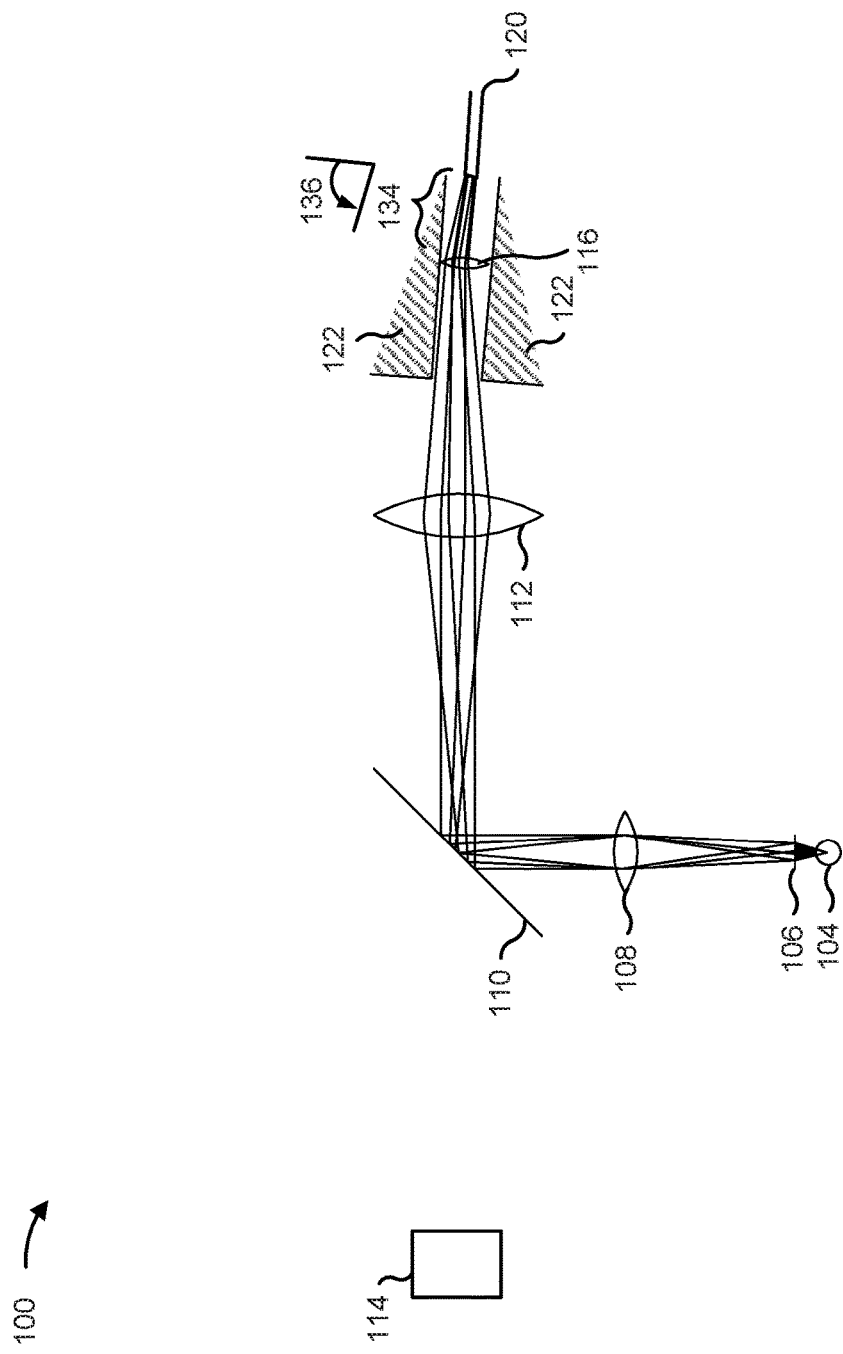
Figure 1D:
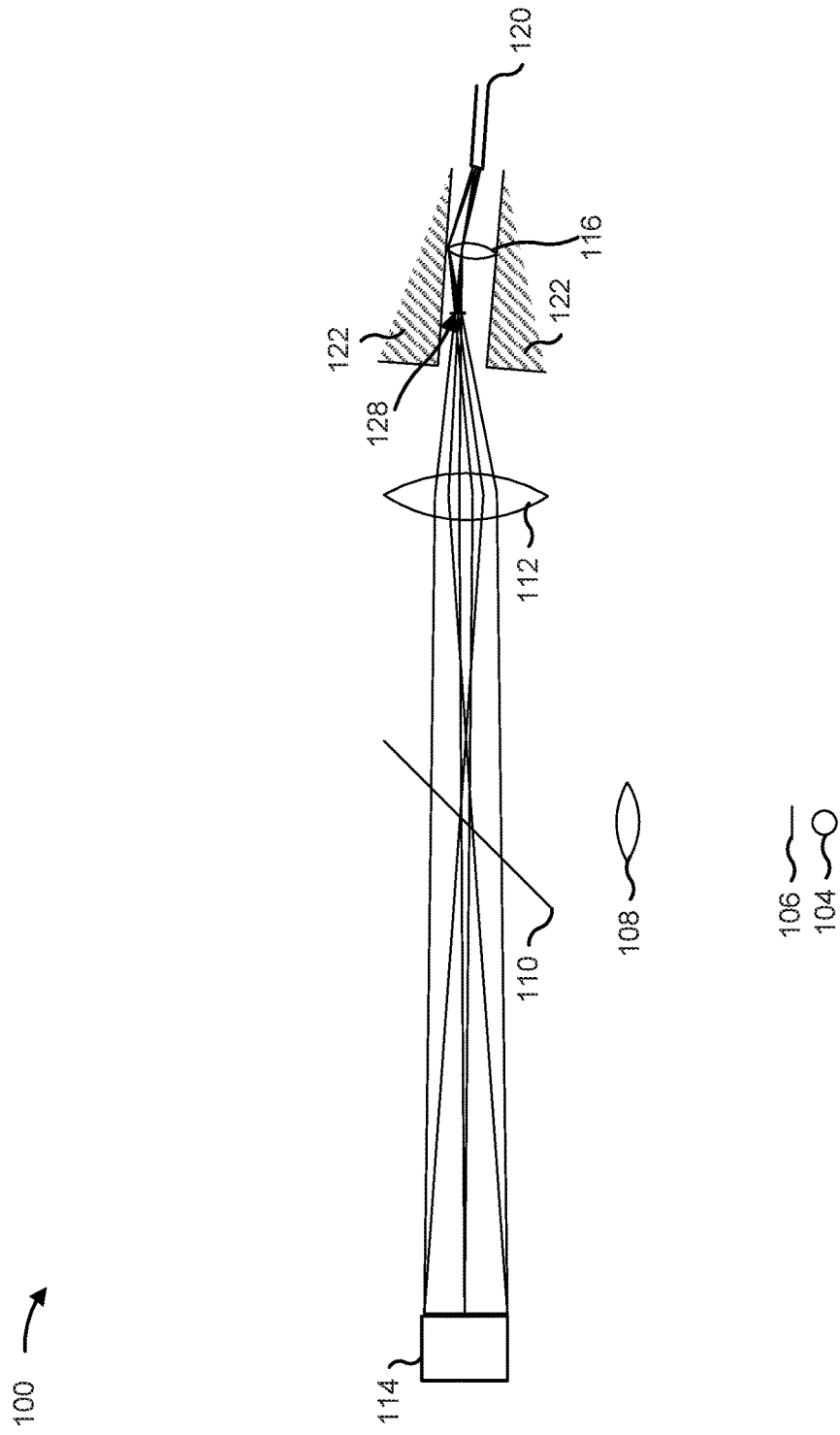

In some implementations, the light source 104 (e.g., a light-emitting-diode and/or the like) may provide light for illuminating the end face of the optical fiber 120 as described herein with respect to FIGS. 1B-1D. As shown in FIG. 1A, the diffuser 106 may be positioned between the light source 104 and the condensing lens system 108.

As shown in FIG. 1A, the condensing lens system 108 may be positioned between the diffuser 106 and the semi-reflective beam splitter 110. In some implementations, the condensing lens system 108 may be configured to provide structure to light from the light source 104 (e.g., provided by the diffuser 106) as described herein with respect to FIGS. 1B-1D. For example, the condensing lens system 108 may include a collimating lens. In some implementations, the condensing lens system 108 may include one or more optical components (e.g., one or more lenses, one or more filters, one or more prisms, one or more reflective components, one or more diffraction gratings, and/or the like).

As shown in FIG. 1A, the semi-reflective beam splitter 110 may be positioned between the objective lens system 112 and the image sensor 114. In some implementations, the semi-reflective beam splitter 110 may be configured to and/or may be positioned to reflect light from the light source 104 (e.g., provided by the condensing lens system 108) to the objective lens system 112 as described herein with respect to FIGS. 1B-1D. Additionally, or alternatively, the semi-reflective beam splitter 110 may be configured and/or may be positioned to pass light from the objective lens system 112 to the image sensor 114 as described herein with respect to FIGS. 1B-1D.

As shown in FIG. 1A, the objective lens system 112 may be positioned between the semi-reflective beam splitter 110 and the relay lens system 116. In some implementations, the objective lens system 112 may be configured to provide light from the light source 104 (e.g., provided by the semi-reflective beam splitter 110) to the relay lens system 116 and provide light from the relay lens system 116 to the image sensor 114 (e.g., through the semi-reflective beam splitter 110) as described herein with respect to FIGS. 1B-1D.

In some implementations, the objective lens system 112 may include one or more optical components (e.g., one or more lenses, one or more filters, one or more prisms, one or more reflective components, one or more diffraction gratings, and/or the like). For example, the objective lens system 112 may include two or more lenses positioned adjacent to each other.

As shown in FIG. 1A, the image sensor 114 may be positioned on an opposite side of the semi-reflective beam splitter 110 as compared to the objective lens system 112. In some implementations, the image sensor 114 may be configured to capture an image of the end face of the optical fiber 120. In some implementations, the image sensor 114 may be configured to generate, based on light reflected from the end face of the optical fiber 120 (e.g., as described herein with respect to FIGS. 1B-1D), signals, which may be used by the optical device and/or another device to generate and/or display an image of the end face of the optical fiber 120.

As shown in FIG. 1A, the relay lens system 116 may be positioned on an opposite side of the objective lens system 112 as compared to the semi-reflective beam splitter 110. In some implementations, and as shown in FIG. 1A, the relay lens system 116 may be positioned in the attachment housing 118. In some implementations, the relay lens system 116 may be configured to provide light from the objective lens system 112 to the end face of the optical fiber 120. Additionally, or alternatively, the relay lens system 116 may be configured to provide light from the end face of the optical fiber 120 to the objective lens system 112.

In some implementations, the relay lens system 116 may include one or more optical components (e.g., one or more lenses, one or more filters, one or more prisms, one or more reflective components, one or more diffraction gratings, and/or the like). For example, the relay lens system 116 may include two or more lenses, such as a pair of lenses positioned adjacent to each other, a pair of lenses where one lens is to be positioned near the end face of the optical fiber 120, and/or the like.

As shown in FIG. 1A, the attachment housing 118 may have a proximal end (e.g., adjacent the device housing 102) and a distal end, where the distal end is configured to be positioned within the bulkhead 122. In some implementations, the attachment housing 118 may be removably attached to the device housing 102 (e.g., via a threaded fastener and/or the like) such that the optical device may be used with other attachments. As shown in FIG. 1A, the relay lens system 116 may be positioned within the distal end of the attachment housing 118. In some implementations, the objective lens system 112 may be positioned within the proximal end of the attachment housing 118.

As shown in FIG. 1A, the objective lens system 112 may have a primary optical axis 124, and the relay lens system 116 may have a relay optical axis 126. In some implementations, and as shown in FIG. 1A, the primary optical axis 124 and the relay optical axis 126 may intersect at an intermediate image plane 128 of the image sensor 114. In some implementations, the intermediate image plane 128 may correspond to a plane where an image of the end face of optical fiber 120 is formed by the relay lens system 116.

As shown in FIG. 1A, the relay optical axis 126 may have a first angular offset 130 with respect to the primary optical axis 124. In some implementations, a position of the relay lens system 116 and/or the first angular offset 130 may be configured such that the primary optical axis 124 and the relay optical axis 126 may intersect at the intermediate image plane 128. In some implementations, the first angular offset 130 may be configured such that at least a portion of light reflected from the end face of the optical fiber 120 passes through the relay lens system 116 (e.g., as described herein with respect to FIGS. 1B-1D). In some implementations, the first angular offset 130 may be approximately 4 degrees.

As shown in FIG. 1A, the end face of the optical fiber 120 may have a second angular offset 132 with respect to a cross-sectional axis of the optical fiber 120. In some implementations, the cross-sectional axis of the optical fiber 120 may be perpendicular to a lengthwise optical axis of the optical fiber 120. Additionally, or alternatively, the second angular offset 132 may be with respect to a mechanical axis of the bulkhead 122. In some implementations, the mechanical axis of the bulkhead 122 may be perpendicular to an opening axis defined by an opening in the bulkhead for providing access to the end face of the optical fiber 120. For example, the opening axis may be substantially parallel to the relay optical axis 126 shown in FIG. 1A. In some implementations, the second angular offset 132 may be approximately 8 degrees.

FIG. 1B is a schematic diagram of the example implementation 100 of the optical device showing the optical elements of the optical device and an illumination path of light from the light source 104 to the end face of the optical fiber 120 recessed within the bulkhead 122. As shown in FIG. 1B, the light source 104 may provide light to the diffuser 106, and the diffuser 106 may diffuse and/or scatter light from the light source 104 and provide the light to the condensing lens system 108.

As shown in FIG. 1B, light rays traveling from the diffuser 106 to the condensing lens system 108 may be diverging. In some implementations, the condensing lens system 108 may be configured to collimate the diverging light and provide the light to the semi-reflective beam splitter 110.

As shown in FIG. 1B, the semi-reflective beam splitter 110 may be configured to and/or may be positioned to reflect light from the condensing lens system 108 to the objective lens system 112. For example, and as shown in FIG. 1A, the semi-reflective beam splitter 110 may be positioned such that a middle point of the semi-reflective beam splitter 110 is aligned with the primary optical axis 124 of the objective lens system 112. Additionally, or alternatively, the semi-reflective beam splitter 110 may be positioned at an angle such that an illumination path of the light from the semi-reflective beam splitter 110 to the objective lens system 112 is parallel to the primary optical axis 124 of the objective lens system 112.

As shown in FIG. 1B, the objective lens system 112 may be configured to provide light from the semi-reflective beam splitter 110 to the relay lens system 116. In some implementations, and as shown in FIG. 1B, the objective lens system 112 may be configured to focus the light from the semi-reflective beam splitter 110 such that all of the light enters the opening in the bulkhead 122. Additionally, or alternatively, the objective lens system 112 may be configured to focus the light from the semi-reflective beam splitter 110 such that at least a majority of the light (e.g., at least 60 percent, at least 70 percent, at least 80 percent, at least 90 percent, and/or the like) enters the opening in the bulkhead 122.

As shown in FIG. 1B, the relay lens system 116 may be configured to provide light from the objective lens system 112 to the end face of the optical fiber 120. In some implementations, and as shown in FIG. 1B, the light from the objective lens system 112 may be incident on the relay lens system 116 at an offset position of the relay lens system 116 due to the first angular offset 130 of the relay optical axis 126 with respect to the primary optical axis 124 as shown in FIG. 1A. Even though the light is incident on the relay lens system 116 at the offset position, the relay lens system 116 may provide the light to the end face of the optical fiber 120. In some implementations, the relay lens system 116 may be configured to focus the light from the objective lens system 112 such that all of the light is incident on the end face of the optical fiber 120. Additionally, or alternatively, the relay lens system 116 may be configured to focus the light from the objective lens system 112 such that at least a majority of the light (e.g., at least 60 percent, at least 70 percent, at least 80 percent, at least 90 percent, and/or the like) is incident on the end face of the optical fiber 120.

In some implementations, and as shown in FIG. 1B, light traveling from the relay lens system 116 to the end face of the optical fiber 120 may pass along a portion 134 of the illumination path proximate the end face of the optical fiber 120. As shown in FIG. 1B, the portion 134 of the illumination path proximate the end face of the optical fiber 120 may have a third angular offset 136 with respect to the cross-sectional axis of the optical fiber 120. In some implementations, the first angular offset 130 of the relay optical axis 126 with respect to the primary optical axis 124 (shown in FIG. 1A) may cause the portion 134 of the illumination path to have the third angular offset 136. By causing the portion 134 of the illumination path proximate the end face of the optical fiber 120 to have the third angular offset 136, at least a portion of light incident on the end face of the optical fiber 120 may be reflected, by the end face, back to the relay lens system 116 (as shown in FIG. 1C) even though the end face of the optical fiber 120 has the second angular offset 132.

FIG. 1C is a schematic diagram of the example implementation 100 showing an enlarged view of the relay lens system 116, the end face of the optical fiber 120, and the portion 134 of the illumination path proximate the end face of the optical fiber 120. In FIG. 1C, the dashed lines represent light when the relay optical axis 126 corresponds to the primary optical axis 124 (e.g., the relay optical axis 126 does not have the first angular offset 130 with respect to the primary optical axis 124 as shown in FIG. 1A) and the portion 134 of the illumination path does not have the third angular offset 136 (e.g., as shown in FIG. 1B). As shown by the dashed lines in FIG. 1C, only a portion of the light passing through relay lens system 116 is incident on the end face of the optical fiber 120, and, due to the second angular offset 132 (as shown in FIG. 1A) of the end face, light reflected by the end face of the optical fiber 120 does not pass through the relay lens system 116. Because the light reflected by the end face of the optical fiber 120 does not pass through the relay lens system 116, the image sensor 114 may not capture an image of the end face of the optical fiber 120.

In FIG. 1C, the solid lines represent light when the relay optical axis 126 has the first angular offset 130 with respect to the primary optical axis 124 (as shown in FIG. 1A) and the portion 134 of the illumination path has the third angular offset 136 (e.g., as shown in FIG. 1B). As shown by the solid lines in FIG. 1C, all of the light passing through relay lens system 116 is incident on the end face of the optical fiber 120, and, despite the second angular offset 132 (as shown in FIG. 1A) of the end face, light reflected by the end face of the optical fiber 120 passes through the relay lens system 116. Because the light reflected by the end face of the optical fiber 120 passes through the relay lens system 116, the image sensor 114 may capture an image of the end face of the optical fiber 120.

FIG. 1D is a schematic diagram of the example implementation 100 of the optical device showing the optical elements of the optical device and an imaging path of light from the end face of the optical fiber 120 to the image sensor 114. As shown in FIG. 1D, the end face of the optical fiber 120 may reflect light incident on the end face of the optical fiber 120 back to the relay lens system 116 (e.g., as also shown in FIG. 1C).

As shown in FIG. 1D, the relay lens system 116 may provide light reflected from the end face of the optical fiber 120 to the objective lens system 112. In some implementations, light from the relay lens system 116 may pass through the intermediate image plane 128 on the imaging path to the objective lens system 112. For example, the relay lens system 116 may form an image (e.g., of the end face of the optical fiber 120) at the intermediate image plane 128.

As shown in FIG. 1D, the objective lens system 112 may provide light from the relay lens system 116 through the semi-reflective beam splitter 110 to the image sensor 114. For example, the objective lens system 112 may relay the image formed by the relay lens system 116 to the image sensor 114. In some implementations, the objective lens system 112 may re-image the image formed by the relay lens system 116.

As described with respect to FIG. 1A, the semi-reflective beam splitter 110 may be configured to and/or may be positioned to pass light from the objective lens system 112 to the image sensor 114. Based on light reflected from the end face of the optical fiber 120 provided to the image sensor 114 by the relay lens system 116 and the objective lens system 112, the image sensor 114 may capture an image of the end face of the optical fiber 120 and/or generate signals, which may be used by the optical device and/or another device to generate and/or display an image of the end face of the optical fiber 120. In this way, the optical device and/or the optical system may illuminate and capture an image of an angled end face of the optical fiber 120 recessed within the bulkhead 122, which may be used by a technician to determine whether the angled end face is clean and undamaged (e.g., without removing the bulkhead of the connector, which may introduce additional contaminants).

As indicated above, FIGS. 1A-1D are provided merely as one or more examples. Other examples may differ from what is described with regard to FIGS. 1A-1D.

Figure 2A:
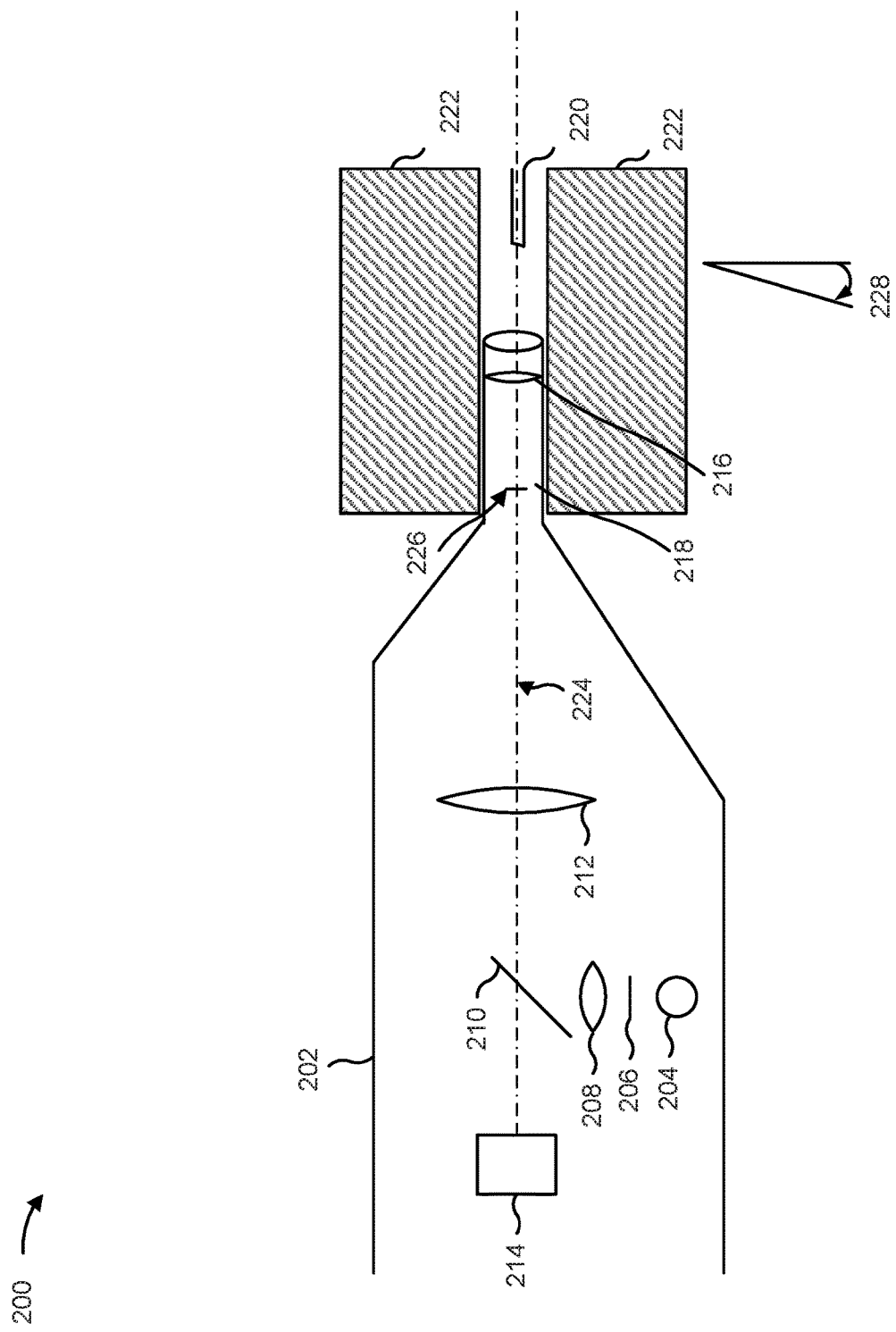
FIGS. 2A-2C are diagrams of one or more example implementations of an optical device for illuminating and viewing recessed angled surfaces described herein.
Figure 2B:
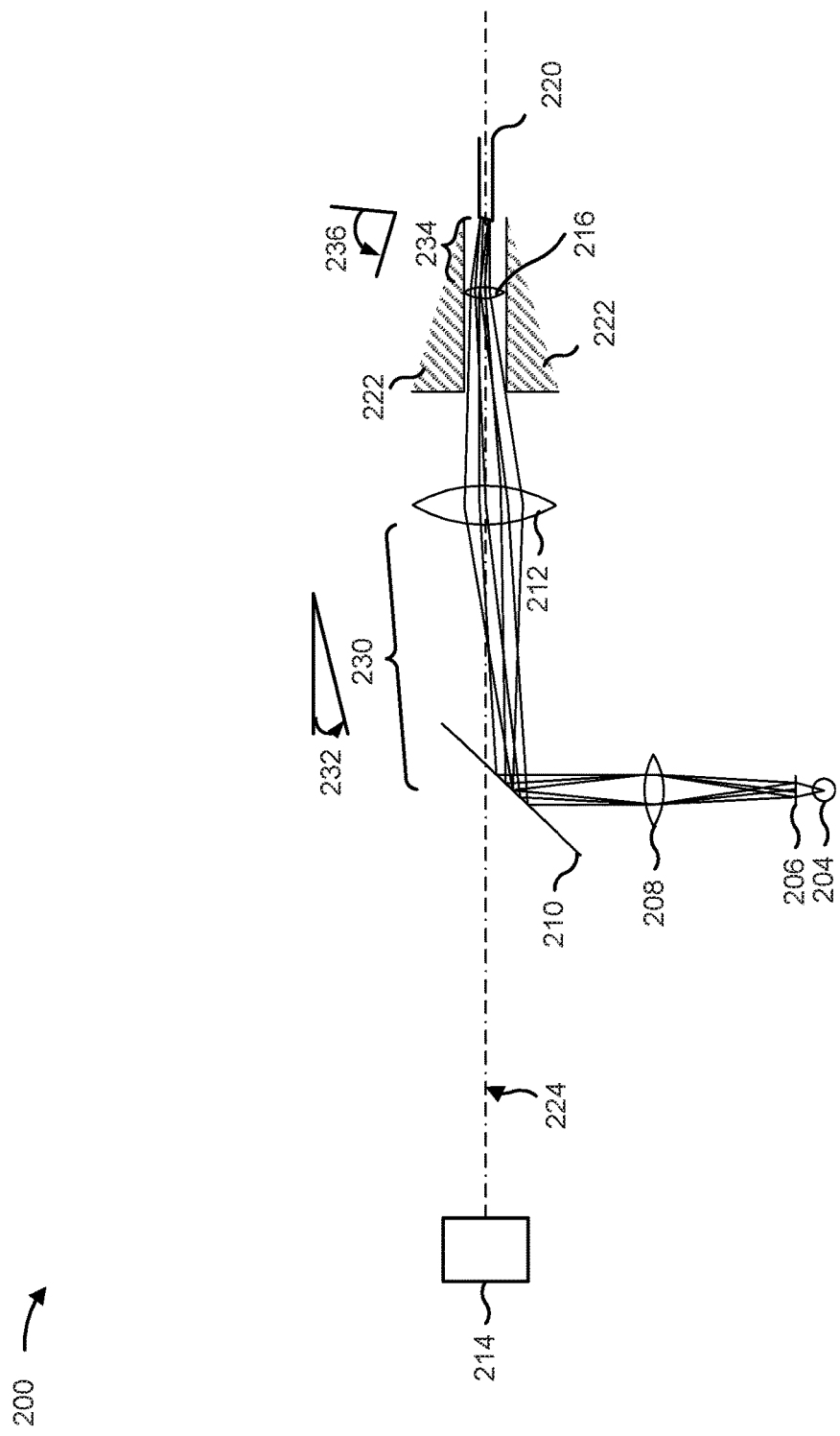
Figure 2C:
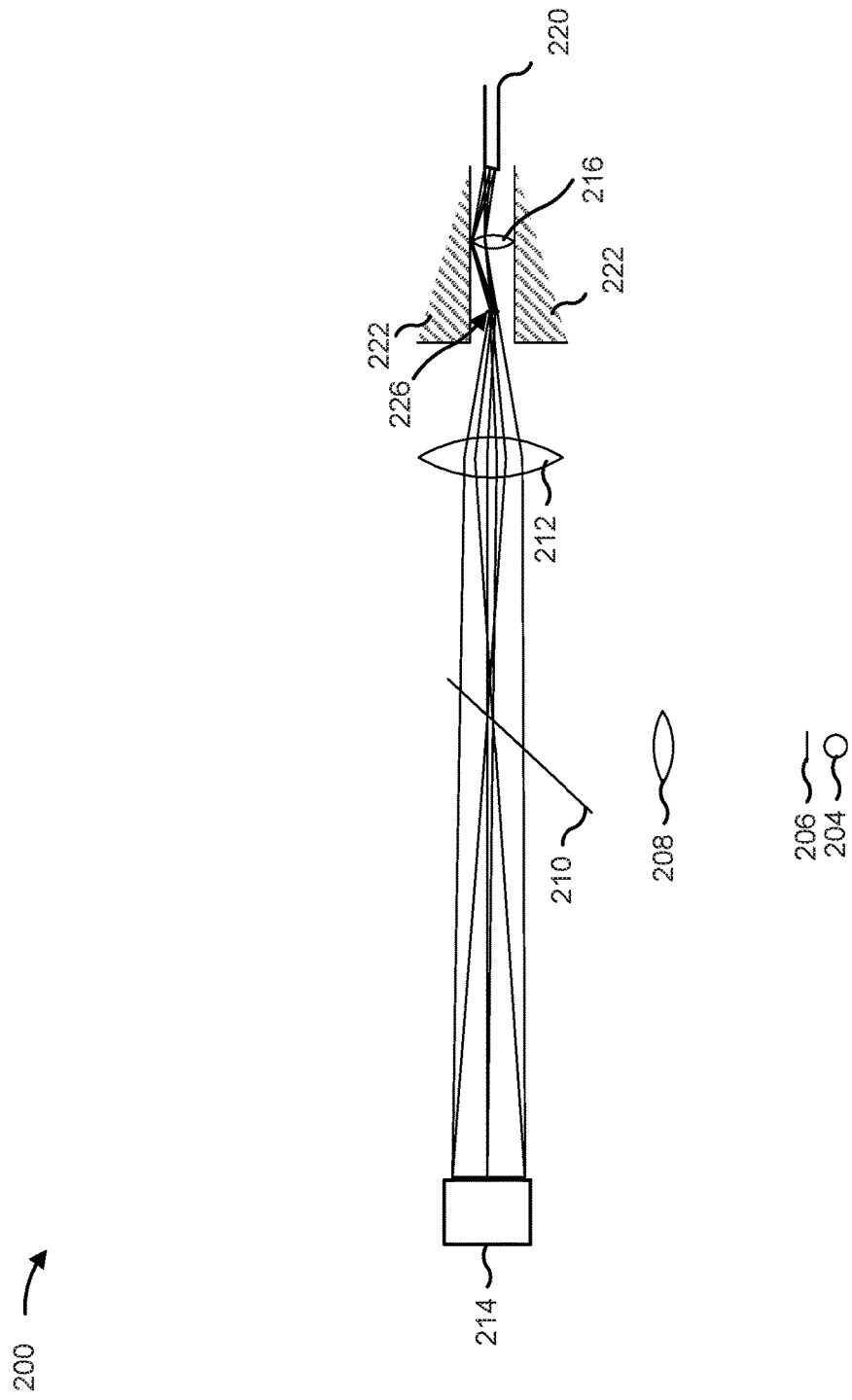

FIGS. 2A-2C are diagrams of one or more example implementations 200 of an optical device for illuminating and viewing recessed angled surfaces described herein. As shown in FIG. 2A, the optical device may include a device housing 202, a light source 204, a diffuser 206, a condensing lens system 208, a semi-reflective beam splitter 210, an objective lens system 212, an image sensor 214, a relay lens system 216, and an attachment housing 218. In some implementations, one or more elements of the optical device may form an optical system. For example, the optical system may include the diffuser 206, the condensing lens system 208, the semi-reflective beam splitter 210, the objective lens system 212, the relay lens system 216, and/or the like. As shown in FIG. 2A, the light source 204, the diffuser 206, the condensing lens system 208, the semi-reflective beam splitter 210, the objective lens system 212, and the image sensor 214 may be positioned within the device housing 202. In some implementations, the optical device may illuminate an end face of an optical fiber 220 recessed within a bulkhead 222 (e.g., of a connector, of an optical switch, and/or the like).

In some implementations, the light source 204, the diffuser 206, and the condensing lens system 208, respectively, may be similar to the light source 104, the diffuser 106, and the condensing lens system 108 described herein with respect to FIGS. 1A-1D. For example, and as shown in FIG. 2A, the diffuser 206 may be positioned between the light source 204 and the condensing lens system 208.

In some implementations, the semi-reflective beam splitter 210 may be similar to the semi-reflective beam splitter 110 described herein with respect to FIGS. 1A-1D. However, in some implementations, and as shown in FIG. 2A, the semi-reflective beam splitter 210 may be positioned in a location that is shifted (e.g., perpendicularly) from a primary optical axis 224 of the objective lens element 212 as compared to a position of the semi-reflective beam splitter 110 with respect to the primary optical axis 124 described herein with respect to FIGS. 1A-1D. Additionally, or alternatively, the semi-reflective beam splitter 210 may be positioned at an angle that is different from an angle at which the semi-reflective beam splitter 110 is positioned.

In some implementations, the objective lens system 212 may be similar to the objective lens system 112 as described herein with respect to FIGS. 1A-1D. For example, the objective lens system 212 may have a primary optical axis 224 and may be configured to provide light from the light source 204 (e.g., provided by the semi-reflective beam splitter 210) to the relay lens system 216 and provide light from the relay lens system 216 to the image sensor 214 (e.g., through the semi-reflective beam splitter 210) as described herein with respect to FIGS. 2B-2C.

In some implementations, the image sensor 214 may be similar to the image sensor 114 as described herein with respect to FIGS. 1A-1D. For example, the image sensor 214 may be configured to capture an image of the end face of the optical fiber 120 at an intermediate image plane 226.

In some implementations, the relay lens system 216 may be similar to the relay lens system 116 as described herein with respect to FIGS. 1A-1D. However, in some implementations, and as shown in FIG. 2A, the relay lens system 216 may share the primary optical axis 224 with the objective lens system 212. In other words, the relay lens system 216 may not have the relay optical axis 126 having the first angular offset 120 as compared to the relay lens system 116 as described herein with respect to FIGS. 1A-1D. Stated yet another way, the relay lens system 216 may have a relay optical axis, but the relay optical axis may correspond to the primary optical axis 224 and may not have an angular offset with respect to the primary optical axis 224.

As shown in FIG. 2A, the attachment housing 218 may have a proximal end (e.g., adjacent the device housing 202) and a distal end, where the distal end is configured to be positioned within the bulkhead 222. In some implementations, the attachment housing 218 may be similar to the attachment housing 118 described herein with respect to FIGS. 1A-1D. For example, and as shown in FIG. 2A, the relay lens system 216 may be positioned within the distal end of the attachment housing 218. In some implementations, the objective lens system 212 may be positioned within the proximal end of the attachment housing 218.

As shown in FIG. 2A, the end face of the optical fiber 220 may have a first angular offset 228 with respect to a cross-sectional axis of the optical fiber 220. In some implementations, the cross-sectional axis of the optical fiber 220 may be perpendicular to a lengthwise optical axis of the optical fiber 220. Additionally, or alternatively, the first angular offset 228 may be with respect to a mechanical axis of the bulkhead 222. In some implementations, the mechanical axis of the bulkhead 222 may be perpendicular to an opening axis defined by an opening in the bulkhead for providing access to the end face of the optical fiber 220. For example, the opening axis may be substantially parallel to the primary optical axis 224 shown in FIG. 2A. In some implementations, the first angular offset 228 may be approximately 8 degrees.

FIG. 2B is a schematic diagram of the example implementation 200 of the optical device showing the optical elements of the optical device and an illumination path of light from the light source 204 to the end face of the optical fiber 220 recessed within the bulkhead 222. As shown in FIG. 2B, the light source 204 may provide light to the diffuser 206, and the diffuser 206 may diffuse and/or scatter light from the light source 204 and provide the light to the condensing lens system 208.

As shown in FIG. 2B, light rays traveling from the diffuser 206 to the condensing lens system 208 may be diverging. In some implementations, the condensing lens system 208 may be configured to collimate the diverging light and provide the light to the semi-reflective beam splitter 210.

As shown in FIG. 2B, the semi-reflective beam splitter 210 may be configured to and/or may be positioned to reflect light from the condensing lens system 208 to the objective lens system 212. In some implementations, and as shown in FIG. 2B, the semi-reflective beam splitter 110 may be positioned to reflect light from the condensing lens system 208 to the objective lens system 212 along a first portion 230 of an illumination path having a second angular offset 232 with respect to the primary optical axis 224 of the objective lens system 212. For example, the semi-reflective beam splitter 210 may be positioned such that a middle point of the semi-reflective beam splitter 210 is not aligned with the primary optical axis 224 of the objective lens system 212 to achieve the second angular offset 232. Additionally, or alternatively, the semi-reflective beam splitter 210 may be positioned at an angle such that the first portion 230 of the illumination path has the second angular offset 232 with respect to the primary optical axis 224.

As shown in FIG. 2B, the objective lens system 212 may be configured to provide light from the semi-reflective beam splitter 210 to the relay lens system 216. In some implementations, and as shown in FIG. 2B, the objective lens system 212 may be configured to focus the light from the semi-reflective beam splitter 210 such that all of the light enters the opening in the bulkhead 222. Additionally, or alternatively, the objective lens system 212 may be configured to focus the light from the semi-reflective beam splitter 210 such that at least a majority of the light (e.g., at least 60 percent, at least 70 percent, at least 80 percent, at least 90 percent, and/or the like) enters the opening in the bulkhead 222.

As shown in FIG. 2B, the relay lens system 216 may be configured to provide light from the objective lens system 212 to the end face of the optical fiber 220. In some implementations, and as shown in FIG. 2B, the light from the objective lens system 212 may be incident on the relay lens system 216 at an offset position of the relay lens system 216 due to the second angular offset 232 of the first portion 230 of the illumination path with respect to the primary optical axis 224. Even though the light is incident on the relay lens system 216 at the offset position, the relay lens system 216 may provide the light to the end face of the optical fiber 220. In some implementations, the relay lens system 216 may be configured to focus the light from the objective lens system 212 such that all of the light is incident on the end face of the optical fiber 220. Additionally, or alternatively, the relay lens system 216 may be configured to focus the light from the objective lens system 212 such that at least a majority of the light (e.g., at least 60 percent, at least 70 percent, at least 80 percent, at least 90 percent, and/or the like) is incident on the end face of the optical fiber 220.

In some implementations, and as shown in FIG. 2B, light traveling from the relay lens system 216 to the end face of the optical fiber 220 may pass along a portion 234 of the illumination path proximate the end face of the optical fiber 220. As shown in FIG. 2B, the portion 234 of the illumination path proximate the end face of the optical fiber 220 may have a third angular offset 236 with respect to the cross-sectional axis of the optical fiber 220. In some implementations, the second angular offset 232 of the first portion 230 of the illumination path with respect to the primary optical axis 224 may cause the portion 234 of the illumination path to have the third angular offset 236. By causing the portion 234 of the illumination path proximate the end face of the optical fiber 220 to have the third angular offset 236, at least a portion of light incident on the end face of the optical fiber 220 may be reflected, by the end face, back to the relay lens system 216 (as shown in FIG. 2C) even though the end face of the optical fiber 220 has the first angular offset 228. For example, the end face of the optical fiber 220 may reflect light incident on the end face of the optical fiber 220 back to the relay lens system 216 in a manner similar to that described herein with respect to FIG. 1C.

FIG. 2C is a schematic diagram of the example implementation 200 of the optical device showing the optical elements of the optical device and an imaging path of light from the end face of the optical fiber 220 to the image sensor 214. As shown in FIG. 2C, the end face of the optical fiber 220 may reflect light incident on the end face of the optical fiber 220 back to the relay lens system 216 (e.g., as also shown in FIG. 1C).

As shown in FIG. 2C, the relay lens system 216 may provide light reflected from the end face of the optical fiber 220 to the objective lens system 212. In some implementations, light from the relay lens system 216 may pass through the intermediate image plane 226 on the imaging path to the objective lens system 212.

As shown in FIG. 2C, the objective lens system 212 may provide light from the relay lens system 216 through the semi-reflective beam splitter 210 to the image sensor 214. As described with respect to FIG. 2A, the semi-reflective beam splitter 210 may be configured to and/or may be positioned to pass light from the objective lens system 212 to the image sensor 214. Based on light reflected from the end face of the optical fiber 220 provided to the image sensor 214 by the relay lens system 216 and the objective lens system 212, the image sensor 214 may capture an image of the end face of the optical fiber 220 and/or generate signals, which may be used by the optical device and/or another device to generate and/or display an image of the end face of the optical fiber 220. In this way, the optical device and/or the optical system may illuminate and capture an image of an angled end face of the optical fiber 220 recessed within the bulkhead 222, which may be used by a technician to determine whether the angled end face is clean and undamaged (e.g., without removing the bulkhead of the connector, which may introduce additional contaminants).

As indicated above, FIGS. 2A-2C are provided merely as one or more examples. Other examples may differ from what is described with regard to FIGS. 2A-2C.

Figure 3:
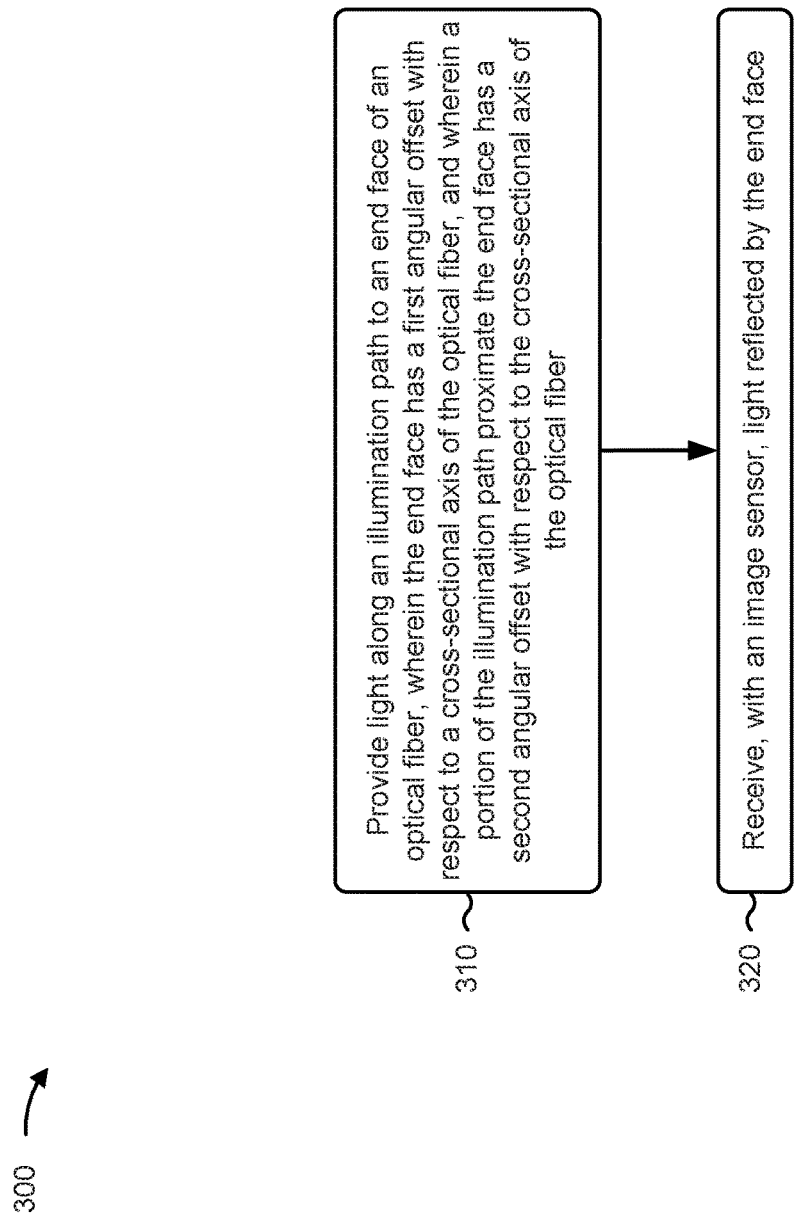
FIG. 3 is a flowchart of an example process for illuminating and viewing an end face of an optical fiber.

FIG. 3 is a flowchart of an example process 300 for illuminating and viewing an end face of an optical fiber. In some implementations, one or more process blocks of FIG. 3 may be performed by a device (e.g., an optical device such as described with respect to FIGS. 1A-1D and/or FIGS. 2A-2C). In some implementations, one or more process blocks of FIG. 3 may be performed by another device or a group of devices separate from or including the device, such as an optical system (e.g., an optical system such as described with respect to FIGS. 1A-1D and/or FIGS. 2A-2C), and/or the like.

As shown in FIG. 3, process 300 may include providing light along an illumination path to an end face of an optical fiber, wherein the end face has a first angular offset with respect to a cross-sectional axis of the optical fiber, and wherein a portion of the illumination path proximate the end face has a second angular offset with respect to the cross-sectional axis of the optical fiber (block 310). For example, the device (e.g., using a light source, a diffuser, a condensing lens system, a semi-reflective beam splitter, an objective lens system, a relay lens system, and/or the like) may provide light along an illumination path to an end face of an optical fiber, as described above. In some implementations, the end face is recessed within a bulkhead. In some implementations, the end face has a first angular offset with respect to a cross-sectional axis of the optical fiber. In some implementations, a portion of the illumination path proximate the end face has a second angular offset with respect to the cross-sectional axis of the optical fiber.

As further shown in FIG. 3, process 300 may include receiving, with an image sensor, light reflected by the end face (block 320). For example, the device (e.g., using a relay lens system, an objective lens system, a semi-reflective beam splitter, and/or the like) may receive, with an image sensor, light reflected by the end face, as described above.

Process 300 may include additional implementations, such as any single implementation or any combination of implementations described below and/or in connection with one or more other processes described elsewhere herein.

In a first implementation, providing the light along the illumination path includes providing, with an objective lens system, the light to a relay lens system positioned within a bulkhead, wherein the portion of the illumination path proximate the end face extends from the relay lens system to the end face.

In a second implementation, alone or in combination with the first implementation, the illumination path from the objective lens system to the relay lens system is parallel to a primary optical axis of the objective lens system, and the relay lens system has a relay optical axis having a third angular offset with respect to the primary optical axis.

In a third implementation, alone or in combination with one or more of the first and second implementations, the illumination path, from the objective lens system to the relay lens system, has a third angular offset with respect to a primary optical axis of the objective lens system.

In a fourth implementation, alone or in combination with one or more of the first through third implementations, process 300 includes positioning a portion of the device within a bulkhead.

In a fifth implementation, alone or in combination with one or more of the first through fourth implementations, process 300 includes capturing, with the image sensor, an image of the end face.

Although FIG. 3 shows example blocks of process 300, in some implementations, process 300 may include additional blocks, fewer blocks, different blocks, or differently arranged blocks than those depicted in FIG. 3. Additionally, or alternatively, two or more of the blocks of process 300 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An optical system, comprising:
   an objective lens system having a primary optical axis; and
   a relay lens system having a relay optical axis,
      wherein the relay optical axis has a first angular offset with respect to the primary optical axis;
   wherein the objective lens system is configured to:
      provide light from a light source to the relay lens system, and
      provide light from the relay lens system to an image sensor; and
   wherein the relay lens system is configured to:
      provide light from the objective lens system to an end face of an optical fiber,
         wherein the end face has a second angular offset with respect to a cross-sectional axis of the optical fiber, and
      provide light reflected from the end face to the objective lens system.

2. The optical system of claim 1, wherein the end face is recessed within a bulkhead.

3. The optical system of claim 1, wherein the primary optical axis and the relay optical axis intersect at an intermediate image plane of the image sensor.

4. The optical system of claim 1, wherein at least one of the objective lens system or the relay lens system comprises two or more lenses.

5. The optical system of claim 1, wherein the first angular offset is approximately 4°, and
   wherein the second angular offset is approximately 8°.

6. The optical system of claim 1, further comprising:
   a semi-reflective beam splitter configured to:
      reflect light from the light source to the objective lens system, and
      pass light from the objective lens system to the image sensor.

7. The optical system of claim 1, further comprising:
   a condensing lens system positioned between the light source and the objective lens system,
   wherein the condensing lens system is configured to provide structure to light from the light source.

8. The optical system of claim 1, wherein the relay lens system is configured to be positioned within a bulkhead.

9. The optical system of claim 1, wherein an illumination path extends from the light source to the end face, and
wherein a portion of the illumination path proximate the end face has a third angular offset with respect to the cross-sectional axis of the optical fiber.

10. A device, comprising:
an attachment housing having a proximal end and a distal end;
an objective lens system having a primary optical axis; and
a relay lens system positioned within the distal end of the attachment housing,
wherein the relay lens system has a relay optical axis having a first angular offset with respect to the primary optical axis;
wherein the objective lens system is configured to:
provide light from a light source to the relay lens system, and
provide light from the relay lens system to an image sensor; and
wherein the relay lens system is configured to:
provide light from the objective lens system to an end face of an optical fiber,
wherein the end face has a second angular offset with respect to a cross-sectional axis of the optical fiber, and
provide light reflected from the end face to the objective lens system.

11. The device of claim 10, wherein the objective lens system is positioned within the proximal end of the attachment housing.

12. The device of claim 10, wherein the primary optical axis and the relay optical axis intersect at an intermediate image plane of the image sensor.

13. The device of claim 10, further comprising:
a semi-reflective beam splitter configured to:
reflect light from the light source to the objective lens system, and
pass light from the objective lens system to the image sensor.

14. The device of claim 10, further comprising:
the light source; and
the image sensor.

15. The device of claim 10, wherein an illumination path extends from the light source to the end face, and
wherein a portion of the illumination path proximate the end face has a third angular offset with respect to the cross-sectional axis of the optical fiber.

16. A method, comprising:
providing, by a device, light along an illumination path to an end face of an optical fiber,
wherein the end face has a first angular offset with respect to a cross-sectional axis of the optical fiber, and
wherein a portion of the illumination path proximate the end face has a second angular offset with respect to the cross-sectional axis of the optical fiber; and
receiving, by the device and with an image sensor, light reflected by the end face.

17. The method of claim 16, wherein providing the light along the illumination path comprises:
providing, with an objective lens system, the light to a relay lens system positioned within a bulkhead,
wherein the portion of the illumination path proximate the end face extends from the relay lens system to the end face.

18. The method of claim 17, wherein the illumination path from the objective lens system to the relay lens system is parallel to a primary optical axis of the objective lens system, and
wherein the relay lens system has a relay optical axis having a third angular offset with respect to the primary optical axis.

19. The method of claim 17, wherein the illumination path, from the objective lens system to the relay lens system, has a third angular offset with respect to a primary optical axis of the objective lens system.

20. The method of claim 16, further comprising:
capturing, with the image sensor, an image of the end face.

* * * * *